United States Patent [19]
Snyder

[11] Patent Number: 5,339,991
[45] Date of Patent: Aug. 23, 1994

[54] APPARATUS FOR APPLYING A FOAMABLE RESIN

[75] Inventor: Robert D. Snyder, Metamora, Mich.

[73] Assignee: Foamseal, Inc., Oxford, Mich.

[21] Appl. No.: 991,049

[22] Filed: Dec. 15, 1992

[51] Int. Cl.$^5$ .............................................. B67D 5/52
[52] U.S. Cl. .................... 222/136; 222/145;
222/389; 239/343; 277/12
[58] Field of Search ........................ 222/136, 145, 389;
239/343, 528; 277/1, 12, 72 FM, 135

[56] References Cited

U.S. PATENT DOCUMENTS

| | | | |
|---|---|---|---|
| 3,232,709 | 11/1961 | Cole, III | 23/252 |
| 3,302,891 | 2/1967 | Faro et al. | 239/407 |
| 3,552,417 | 1/1971 | Goff | 137/98 |
| 3,975,128 | 8/1976 | Schluter | 222/136 X |
| 4,277,030 | 7/1981 | Hechler, IV | 239/407 |
| 4,427,153 | 1/1984 | Schoefer | 239/528 X |
| 4,471,887 | 9/1984 | Decker | 222/145 X |
| 4,733,976 | 3/1988 | Henriksson et al. | 277/1 X |

*Primary Examiner*—Andres Kashnikow
*Assistant Examiner*—Joseph A. Kaufman
*Attorney, Agent, or Firm*—Howard & Howard

[57] ABSTRACT

The foam application apparatus or gun of this invention is particularly adapted to prevent leakage of the gun through the nozzle while assuring repeated use without seizure. The foam application apparatus includes a cylindrical mixing chamber having two inlet passages and an outlet passage through which mixed foamable resin is sprayed or discharged under pressure. A cylindrical valve rod having a free end is reciprocated in the mixing chamber from an "off" position, wherein the rod free end blocks the communication from the inlet passages to the outlet passage, and "on " position, wherein the rod is retracted, providing unrestricted communication between the inlet and outlet passages. In one preferred embodiment, a pair of closely spaced radial grooves are provided on the free end of the valve rod. The grooves receive fluid resin to form in situ resin seals which are replenished each time the rod is reciprocated in the chamber. The grooves are preferably spaced sufficiently close to form a thin film interconnecting the fluid resin in the grooves to form a continuous seal. Seizure is prevented by machining the mating cylindrical surfaces of the rod and chamber to very accurate tolerances to provide a diametral tolerance of about 50 millionths to 90 millionths of an inch.

11 Claims, 2 Drawing Sheets

APPARATUS FOR APPLYING A FOAMABLE RESIN

BACKGROUND OF THE INVENTION

Foam spray guns of the type disclosed herein have been used for many applications, including for example, by the construction industry to provide thermal insulation, sound attenuation, etc. Foam application apparatus are commercially available for applying two-component foamable fluid plastic resins, including polyurethanes. Such foam application apparatus may include a cylindrical mixing chamber having separate inlet passages for each component and an axial outlet passage, and the apparatus generally includes a reciprocal valve rod having a free end. The free end of the valve rod reciprocates in the mixing chamber from an "off" position, wherein the valve rod free end blocks the inlet passages, to an "on" position, wherein the rod is retracted in the chamber to permit free communication between the inlet and outlet passages.

The automotive industry utilizes insulation for sound attenuation or deadening and as a thermal insulator. Foamed plastic resins are not generally used for such applications by the automotive industry, although the desire for weight reduction and the use of thinner body panels and plastic fascia makes use of such foam resins attractive. The mass production techniques used by the automotive industry, however, require reliability over tens of thousands of applications. Conventional foam application guns commonly seize up after a few thousand shots, requiring cleaning of the valve components before reuse. Another problem with conventional commercially available two-component foam application guns is leakage of fluid resin, particularly through the nozzle, when the gun is turned off or not in use. Various seals have been used to reduce leakage of foam application guns, including providing a single radial groove in the valve rod adjacent the free end. Fluid resin fills the groove to provide an O-ring-type seal, which is replenished as the rod reciprocates in the mixing chamber.

The attempts to solve these problems with conventional foam application guns for mass-production applications have not, however, been commercially successful. The need therefore remains for a more reliable foam application apparatus, particularly for applying two-component foamable fluid resins, for mass production applications. The foam application gun must be able to operate for tens of thousands of applications, without seizure, and the gun should not leak between applications. The apparatus for applying a two-component foamable fluid plastic resin of this invention solves these problems in a relatively simple manner, and is suitable for mass production applications.

SUMMARY OF THE INVENTION

The apparatus for applying a two-component foamable fluid plastic resin of this invention includes a cylindrical mixing chamber, two radially aligned inlet passages communicating with the mixing chamber which separately receive the components of the foamable resin, an outlet passage through with the mixed foamable resin is discharged under pressure from the apparatus, and a cylindrical valve rod having a free end reciprocably supported in the cylindrical mixing chamber. The problems of valve rod seizure and leakage are separately solved in the foam application gun or apparatus of this invention, but in the most preferred embodiment, both improvements are incorporated. To avoid leakage, the valve rod preferably includes a pair of closely spaced radial grooves adjacent to the free end which receive foamable fluid plastic resin as the free end of the valve rod reciprocates in the mixing chamber. The valve rod reciprocates from an "off" position, wherein the free end and both radial grooves are located between the inlet passages and the outlet passage, to an "on" position, wherein the rod free end is retracted in the mixing chamber to provide unrestricted communication between the inlet and outlet passages.

In this preferred embodiment, the radial grooves in the rod free end are located sufficiently close so that a thin film of fluid plastic resin is formed between the grooves, interconnecting the plastic resin in the grooves, and forming a continuous or integral seal comprising the fluid resin in the grooves and the interconnecting film. This seal prevents leakage of the gun through the nozzle after repeated applications. In the most preferred embodiment, the grooves are each generally rectangular having opposed radial sidewalls and an axial bottom wall and the grooves are spaced a distance about twice the axial width of the bottom walls of the grooves. A pair of grooves each having a radial depth of about 0.020 inches, and an axial width of about one thirty-second (1/32) or about 0.030 inches and an axial space between the grooves of one sixteenth (1/16) of an inch, or twice the width of the grooves, has been found particularly suitable for preventing leakage through the nozzle in mass production applications.

Seizure after repeated applications by the foam application apparatus is avoided in the preferred embodiment by very accurately machining the mating cylindrical surfaces of the mixing chamber and the valve rod free end, such that the outside diameter of the valve rod very nearly equals the inside diameter of the mixing chamber, providing a very close fit. In a preferred application for a two component polyurethane foam or a similar two component foam, the diametral tolerance between the rod and the internal surface of the chamber is 50 millionths to 90 millionths of an inch, ±10 millionths. Somewhat surprisingly, a greater or lesser clearance may result in seizure, even where the mating surfaces are accurately machined.

Specifications for automotive applications of polyurethane foam for pillar applications and the like, requires at least 20,000 shots of the application gun, without seizure or leakage. Commercially available two-component polyurethane foam application guns often seize up in less than 1,000 shots and the apparatus leaks through the nozzle. The apparatus for applying a two-component foamable fluid plastic resins of this invention thus solves the problems with the prior application guns for mass production applications and permits use of lightweight, closed cell two-component polyurethane foams for mass production applications, including automotive applications. As will be understood, however, various modifications may be made to the foamable resin application apparatus of this invention within the purview of the appended claims, the description of the preferred embodiments and the drawings, a brief description of which follows.

DESCRIPTION OF THE PREFERRED EMBODIMENTS

Figure 1:
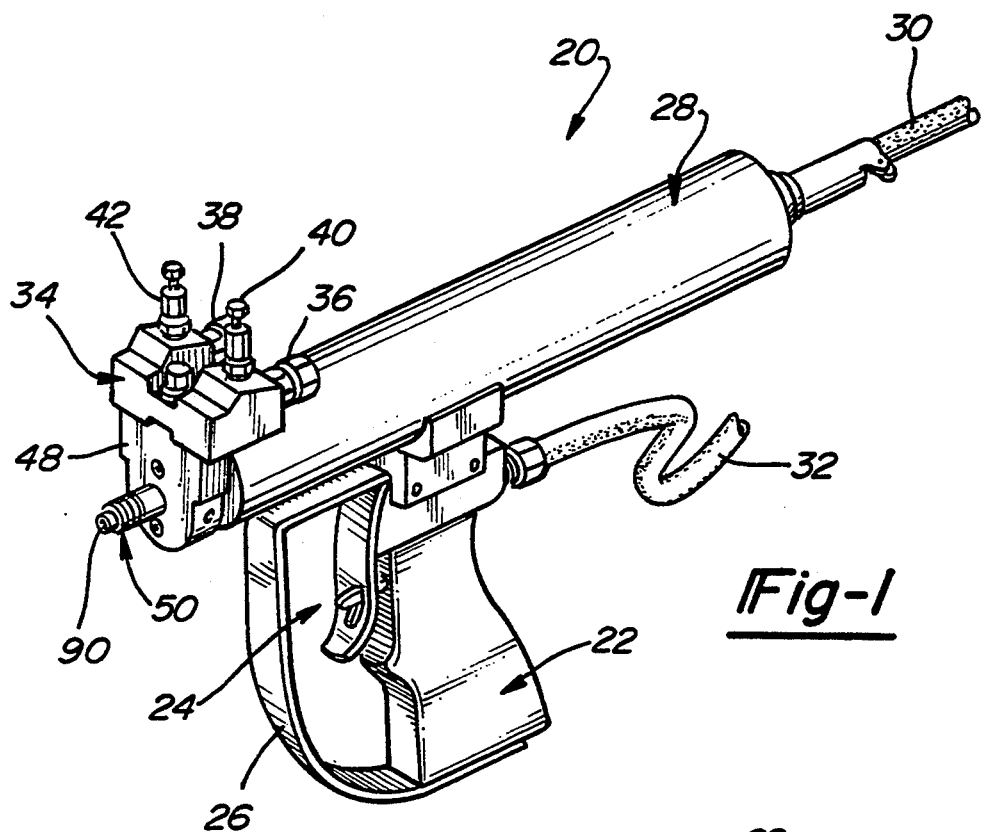
FIG. 1 is a perspective view of an embodiment of an apparatus for spraying a two-component foamable plastic resin of the type of this invention.
Figure 2:
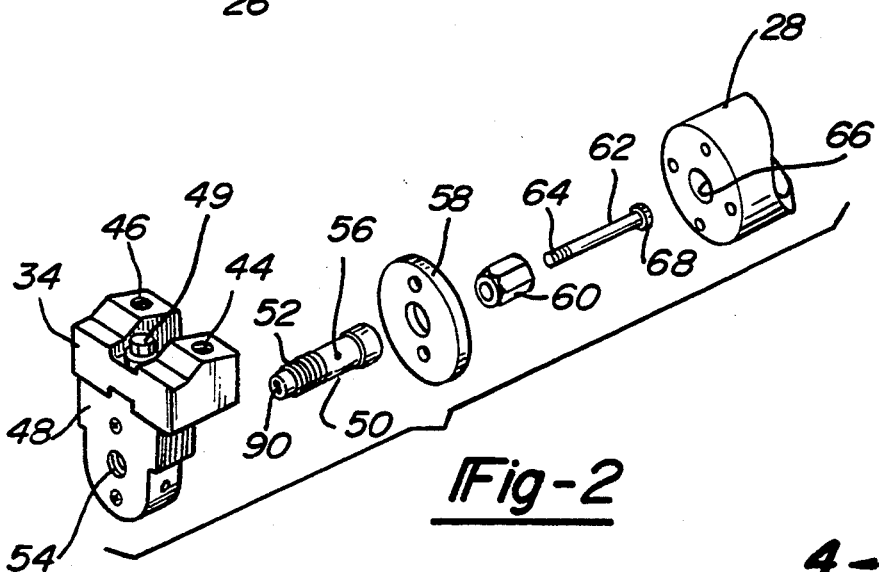
FIG. 2 is an exploded perspective view of the relevant internal components of the apparatus shown in FIG. 1.

FIGS. 1 and 2 illustrate an embodiment of an apparatus 20 for applying a two-component foamable fluid plastic resin of the type useful for the present invention. The disclosed embodiment of the foam application apparatus or gun 20 includes a handle assembly 22, having a trigger assembly 24 and a guard 26. The handle is mounted on a hydraulic cylinder assembly 28 having an internal reciprocal piston (not shown) operated by pressure in hydraulic lines 30 and 32. The forward end of the foam application gun includes a coupling block assembly 34 having threaded connectors 36 and 38 which receive the inlet lines (not shown) for the components of the foamable plastic resin. As described, the apparatus of this invention is particularly, but not exclusively adapted for applying a two component foamable fluid plastic resin, most preferably a two-component foamable polyurethane resin. In such an application, one coupling (36 or 38) would receive the B-resin component of the polyurethane resin and the other would receive the A-isocyanate component. Both components are liquid and are normally received at pressures ranging from 300 to 500 pounds per square inch. In the disclosed embodiment, the inlet bore of couplings 36 and 38 may be closed by threaded valves 40 and 42, respectively. The threaded valves are received in threaded ports 44 and 46, as shown in FIG. 2.

The coupling block assembly 34 is connected to a valve body 48 by bolt 49. Mixing chamber body 50 includes a threaded end 52, which is threadably received in bore 54 of valve body 48. Mixing chamber body 50 includes 2 inlets 56 and 57 (see also FIG. 3) which receive the components of the foamable fluid resin, as described below in regard to FIG. 3. In the disclosed embodiment, a spacer 58 is located between the hydraulic cylinder assembly 28 and the valve body 48 and a valve rod 62 is reciprocably supported in the mixing chamber 50, as described below.

A nut connector 60 is received over the free end 64 of the valve rod 62 and is conventionally threadably received on a piston rod (not shown) reciprocable in port 66 of the hydraulic cylinder assembly 28. As will be understood, the nut connector 60 includes a threaded counter-bore which receives the enlarged end 68 of the valve rod, securing the valve rod 62 for reciprocation with the piston of the hydraulic cylinder 28. The free end 64 of the valve rod is thus fully supported and reciprocated in the mixing chamber 50, as described further below.

Figure 3:
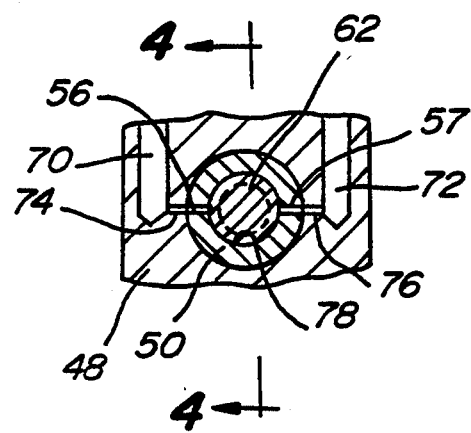
FIG. 3 is a cross-sectional view of the apparatus shown in FIG. 1.

As shown in FIG. 3, the preferred embodiment of the valve body 48 includes two bores or ports 70 and 72 which receive the liquid components of the foamable plastic resin from valve couplings 36 and 40 (see FIG. 1). The ports 70 and 72 then communicate with ports 56 and 57 of mixing chamber body 50 through transverse ports or passages 74 and 76, respectively. Ports 74 and 76 are aligned radially and extend transverse to the longitudinal axis of the cylindrical valve rod end chamber. Further, as shown in FIG. 3, the aligned passages 74 and 56 for one component and 76 and 57 for the other component, have a reduced diameter, providing a pressure drop which is conventional in this type of foam application gun.

Figure 4:
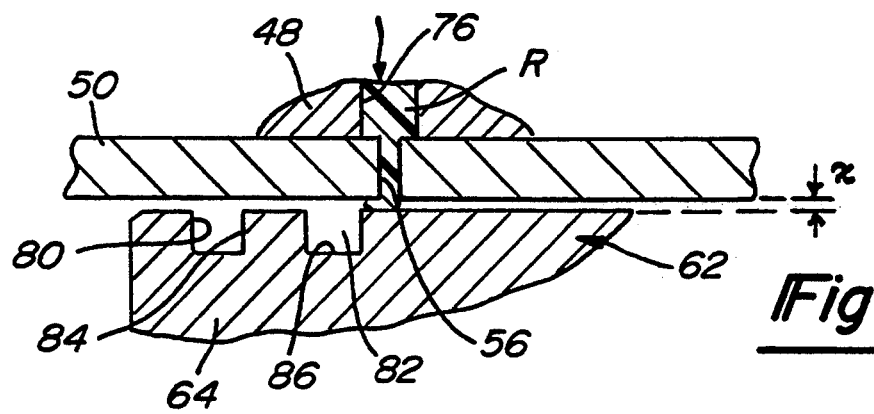
FIG. 4 is a transverse cross-sectional view of FIG. 3, in the direction of view-arrows 4—4, when the valve rod is extended at start-up of the apparatus.
Figure 5:
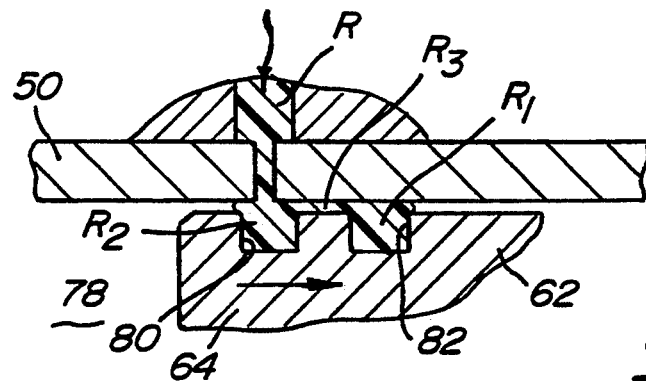
FIG. 5 is a transverse cross-sectional view, similar to FIG. 4, as the valve rod free end is initially retracted.

As shown in FIGS. 4–7, in the preferred embodiment of the foam application gun of this invention, the free end 64 of the valve rod 62 includes two closely spaced radial grooves 80 and 82. In the most preferred embodiment, the grooves 80 and 82 are generally rectangular, including radial sidewalls 84 and axial cylindrical bottom walls 86. At start-up, as shown in FIG. 4, the valve rod 62 is extended, such that the free end 64 is located between the inlet 56 (and 57, shown in FIG. 3) and the outlet 90 of the mixing chamber (see FIGS. 1 and 2). The components of the foamable fluid plastic resin R begins to flow through inlet passage 76 and inlet 56 under the pressure in the inlet lines. The trigger 24 (see FIG. 1) is then depressed, reciprocating the piston rod and retracting the valve rod 62, as shown in FIG. 5. As the valve rod 62 retracts, the components of the foamable fluid plastic resin R flows into the grooves, as shown in FIG. 5. As the rod 62 is retracted, the resin first flows into the groove 82 and then into groove 80, forming in situ resin seals $R_1$ and $R_2$, respectively.

Figure 6:
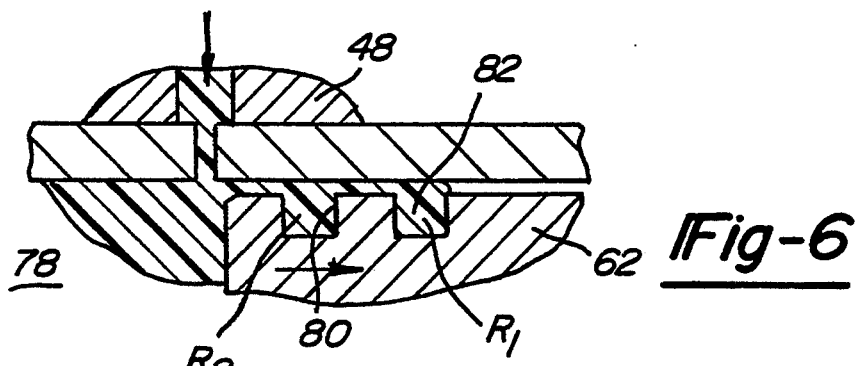
FIG. 6 is a transverse cross-sectional view, similar to FIGS. 4 and 5, when the valve rod free end is retracted to the "on" position.
Figure 7:
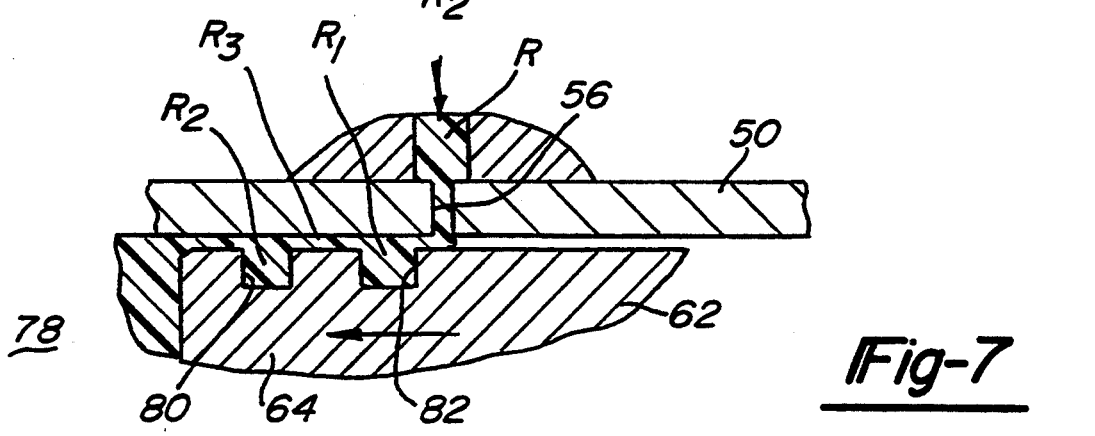
FIG. 7 is a transverse cross-sectional view, similar to FIGS. 5 to 7, when the valve rod is extended to the sealed "off" position.

In the most preferred embodiment, a thin film or sheath of resin $R_3$ is also formed which interconnects the resin seals $R_1$ and $R_2$. When the valve rod 62 is fully retracted, as shown in FIG. 6, the components of the foamable resin are received in the mixing chamber 78, without restriction by the valve rod 62, mixed and ejected under pressure through the axial outlet passage 90 of the mixing chamber body 50. It should be noted that in this "on" position, the resin seals $R_1$ and $R_2$ in grooves 80 and 82 prevent leakage of the resin back into the hydraulic cylinder 28. As will now be understood, the position of the valve rod 62 shown in FIG. 6 is the "on" position, wherein foamable liquid resin is ejected from the gun 20 under pressure, usually in a spray. However, when the valve rod 62 is then extended, as shown in FIG. 7, the free end 64 of the valve rod, including both radial grooves 80 and 82, are located between the inlet passages 56 and 57 and the outlet passage 90. In this position, the resin seals $R_1$ and $R_2$ prevent flow of resin around the rod and into the chamber 78. That is, there is no further pressure on the liquid resin in the chamber 78. This is the "off" position of the valve rod 62.

As described, in the most preferred embodiment, the grooves 80 and 82 are sufficiently close to form a thin film of resin $R_3$ interconnecting the resin seals $R_1$ and $R_2$ to form a continuous or integral seal preventing pressure from reaching the resin in the mixing chamber and leakage of the gun. As described above, it has been found that the use of two closely spaced grooves 80 and 82 adjacent the free end 64 of the valve rod substantially eliminates leakage of the gun through the outlet passage 90. The grooves are preferably rectangular, as shown, which firmly retains the resin in the grooves. Further, the resin seals $R_1$, $R_2$ and $R_3$ are continuously replenished and reformed as the rod is retracted to the "on" position, as shown in FIG. 6, and then extended to the "off" position, as shown in FIG. 7. Rectangular grooves having a radial depth of 0.020 inches (i.e., the length of sidewall 84) and an axial width (i.e., the length of bottom wall 86) of one thirty-second (1/32) or about 0.030 inches, has been found to be particularly suitable for preventing leakage of the gun. The spacing between the grooves is one sixteenth (1/16) or about 0.060 inches, about twice the axial width of the grooves.

As described, the outside diameter of the valve rod 62 adjacent the free end 64 is preferably nearly equal to the inside diameter of the mixing chamber 50 and the cylindrical mating surfaces are very accurately machined to provide a very close fit between the valve rod 62 and the inside diameter of the mixing chamber body 50. As will be understood, however, this clearance is greatly exaggerated in FIGS. 4–7 for purposes of this description only. In the most preferred embodiment, the diametral tolerance between the valve rod and the inside surface of the mixing chamber is 50 millionths to 90 millionths of an inch, or 0.000050 to 0.000090 inches, ±10 millionths. Diametral tolerance is the distance between the "top" surface of the cylindrical valve rod 62 and the "top" surface of the cylindrical chamber, assuming the components are horizontally oriented with the "bottom" cylindrical surfaces in contact, or dimension "x" in FIG. 4.

As will be understood, this very close tolerance will result in a close fit of the cylindrical valve rod 62 in the cylindrical inside surface of the mixing chamber body 50. It has been found that this close tolerance substantially eliminates seizure of the rod 62 in the mixing chamber 50, as experienced with the prior art.

In the disclosed embodiment, the cylindrical valve rod had a reference diameter of 0.187 inches and operated over 60,000 shots without seizure, far exceeding the automotive requirement of 20,000 shots. Surprisingly, substantially reducing or increasing this spacing resulted in seizure. The preferred two-component foamable resin used with the application gun disclosed herein is a rigid closed cell water blown polyurethane having a blown density of 2 pounds per cubic foot. This polyurethane foamable resin is available from Foamseal, Inc. under the tradename PF4000. Having described a preferred embodiment of the apparatus for spraying a two-component foamable plastic resin of this invention, it will be understood that various modifications may be made to the apparatus of this invention within the purview of the appended claims, which follow.

I claim:

1. An apparatus for applying a two-component foamable fluid plastic resin, said apparatus including a cylindrical mixing chamber, two inlet passages communicating with said mixing chamber each receiving one of said components of said foamable resin, an outlet passage communicating with said chamber through which mixed foamable resin is discharged from said apparatus under pressure, and a cylindrical valve rod having a free end reciprocal in said cylindrical mixing chamber, said valve rod reciprocable in said chamber from an off position, wherein said valve rod free end blocks said inlet passage, to an on position, wherein said rod is retracted and said chamber communicates with said outlet passage without restriction, said valve rod having an outside diameter nearly equal to an inside diameter of said cylindrical mixing chamber providing a close fit, and said valve rod having a pair of relatively closely spaced radial grooves adjacent said free end, said grooves receiving said foamable fluid plastic resin and forming in situ resin seals in said grooves preventing fluid resin from flowing around said rod to said outlet when said rod free end is located in said off position, and said seals replenishing as said rod is reciprocated in said chamber.

2. The apparatus for applying a two-component foamable fluid plastic resin, as defined in claim 1, wherein said grooves are sufficiently close to form a thin film of said fluid plastic resin interconnecting said seals, forming a generally continuous seal comprising said seals in said grooves and said film.

3. The apparatus for applying a two-component foamable fluid plastic resin as defined in claim 2, wherein said grooves are generally rectangular, each groove having opposed radial sidewalls and a bottom wall, and the axial space between said grooves on said rod is about twice the axial width of said bottom walls of said grooves.

4. The apparatus for applying a two-component foamable fluid plastic resin as defined in claim 1, wherein said inlet passages extend generally transverse to the longitudinal access of said cylindrical mixing chamber, and said grooves both located between said inlet passages and said outlet passage when said rod free end is located in said off position, said resin seals thereby preventing leakage of said apparatus through said outlet passage.

5. The apparatus for applying a two-component foamable fluid plastic resin as defined in claim 4, wherein said cylindrical valve rod and said cylindrical passage are accurately machined adjacent said valve rod free end and said grooves to provide a diametral tolerance between said valve rod outside diameter and said inside diameter of said mixing chamber of between 50 and 90 millionths of an inch, ±10 millionths.

6. An apparatus for applying a two-component foamable polyurethane resin, said apparatus including a cylindrical mixing chamber, two inlet passages extending generally transversed to and communicating with said mixing chamber receiving said components of said polyurethane foamable resin, a generally axial outlet passage communicating with said cylindrical mixing chamber and through which mixed polyurethane foamable resin is discharged under pressure from said apparatus, and a cylindrical valve rod having a free end reciprocably disposed in said cylindrical mixing chamber, said valve rod having a pair of closely spaced radial grooves adjacent said free end, said valve rod reciprocable from an off position, wherein said valve rod free end and both of said grooves are located between said inlet passages and said outlet passage, to an on position, wherein said valve rod is retracted and said chamber communicates freely with said outlet passage, said grooves each receiving said foamable fluid polyurethane resin as said valve rod free end is reciprocated in said mixing chamber forming in situ resin seals in each of said grooves, said seals preventing foamable fluid polyurethane resin from flowing around said rod to said outlet passage when said valve rod is in said off position, and said resin seals replenishing as said rod is reciprocated within said mixing chamber.

7. The apparatus for applying a two-component foamable polyurethane resin as defined in claim 6, wherein said grooves are closely spaced to form a thin film of said fluid polyurethane resin interconnecting said seals located in said grooves, forming a continuous seal comprising said seals located in said grooves and said thin film.

8. The apparatus for applying a two-component foamable fluid polyurethane resin as defined in claim 7, wherein said grooves are generally rectangular, each having opposed radial sidewalls and a bottom wall, and the axial space between said grooves on said rod is about twice the axial width of said bottom wall of said grooves.

9. An apparatus for applying a two-component foamable fluid plastic resin, said apparatus including a cylindrical mixing chamber, two radial inlet passages communicating with said mixing chamber extending generally transverse to a longitudinal axis of said cylindrical mixing chamber, a generally axial outlet passage communicating with said mixing chamber through which mixed foamable resin is discharged under pressure from said apparatus, and a valve rod having a cylindrical free end reciprocally disposed in said cylindrical mixing chamber, said cylindrical valve rod free end having an outside diameter nearly equal to the inside diameter of said cylindrical mixing chamber and machined to form a very close telescopic fit having a diametral tolerance between said valve rod and said chamber of between 50 and 90 millionths of an inch, ±10 millionths, said valve rod reciprocable from an off position, wherein said valve rod free end is located between said inlet passages and said outlet passage, and an on position, wherein said valve rod free end is retracted within said chamber to provide unobstructed communication between said inlet passages and said outlet passage, wherein said valve rod free end has at least two closely spaced radial grooves, said grooves receiving said foamable resin, forming in situ resin seals in said grooves.

10. The apparatus for applying a two-component foamable fluid plastic resin as defined in claim 11, wherein each of said grooves are generally rectangular, each groove having opposed radial sidewalls and an axial bottom wall, and the axial space between said grooves on said rod being less than about four times the axial width of said bottom walls of said grooves.

11. The apparatus for applying a two-component foamable fluid plastic resin as defined in claim 10, wherein said grooves each have a radial depth of about 0.020 inches and an axial width of about 0.030 inches and said grooves are spaced about 0.060 inches.

* * * * *

UNITED STATES PATENT AND TRADEMARK OFFICE
CERTIFICATE OF CORRECTION

PATENT NO. : 5,339,991
DATED : August 23, 1994
INVENTOR(S) : Robert D. Snyder

It is certified that error appears in the above-indentified patent and that said Letters Patent is hereby corrected as shown below:

Column 8, line 13, after "claim" delete "11," and insert --9,--

Signed and Sealed this

Twenty-ninth Day of November, 1994

Attest:

BRUCE LEHMAN

Attesting Officer     Commissioner of Patents and Trademarks